(12) United States Patent
Grosse et al.

(10) Patent No.: US 12,319,145 B2
(45) Date of Patent: Jun. 3, 2025

(54) ENERGY-STORE FLOOR ASSEMBLY FOR AN ELECTRICALLY DRIVABLE PASSENGER CAR

(71) Applicant: Bayerische Motoren Werke Aktiengesellschaft, Munich (DE)

(72) Inventors: Ronny Grosse, Eichenau (DE); Martin Schuster, Munich (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 320 days.

(21) Appl. No.: 18/010,496

(22) PCT Filed: Sep. 2, 2021

(86) PCT No.: PCT/EP2021/074213
§ 371 (c)(1),
(2) Date: Dec. 15, 2022

(87) PCT Pub. No.: WO2022/049170
PCT Pub. Date: Mar. 10, 2022

(65) Prior Publication Data
US 2023/0241958 A1  Aug. 3, 2023

(30) Foreign Application Priority Data

Sep. 7, 2020 (DE) .................. 10 2020 123 289.6

(51) Int. Cl.
*B60K 1/04* (2019.01)
*B60K 6/40* (2007.10)
*B62D 25/20* (2006.01)

(52) U.S. Cl.
CPC .......... *B60K 6/40* (2013.01); *B62D 25/2027* (2013.01); *B60Y 2200/11* (2013.01);
(Continued)

(58) Field of Classification Search
CPC .............. B60K 2001/0438; B60K 1/04; B60Y 2200/91; B62D 25/2009
See application file for complete search history.

(56) References Cited

U.S. PATENT DOCUMENTS

2008/0283318 A1  11/2008  Wagner et al.
2011/0148089 A1*  6/2011  Klimek ................ B60K 15/067
                                        903/902
(Continued)

FOREIGN PATENT DOCUMENTS

DE  10 2007 023 392 A1  11/2008
DE  10 2013 008 657 A1  11/2014
(Continued)

OTHER PUBLICATIONS

International Search Report (PCT/ISA/210) issued in PCT Application No. PCT/EP2021/074213 dated Nov. 22, 2021 with English translation (five (5) pages).
(Continued)

*Primary Examiner* — Jason D Shanske
*Assistant Examiner* — James J Triggs
(74) *Attorney, Agent, or Firm* — Crowell & Moring LLP

(57) ABSTRACT

An energy-store floor assembly for an electrically drivable passenger car, the energy-store floor assembly having a floor assembly, on the bottom side of which an energy storage device of an electric drive of the passenger car is fixed. Lateral side receptacles, in the region of which a separate fastening point is located to which the energy storage device can be fastened, are positioned on the floor assembly. A modular system for manufacturing such an energy-store floor assembly is provided.

7 Claims, 6 Drawing Sheets

(52) U.S. Cl.
CPC ....... *B60Y 2200/91* (2013.01); *B60Y 2200/92* (2013.01); *B60Y 2400/10* (2013.01); *B60Y 2400/112* (2013.01)

(56) References Cited

U.S. PATENT DOCUMENTS

| | | |
|---|---|---|
| 2011/0284299 A1 | 11/2011 | Takahashi et al. |
| 2014/0338999 A1 | 11/2014 | Fujii et al. |
| 2019/0135100 A1 | 5/2019 | Lange et al. |
| 2019/0207181 A1 | 7/2019 | Raepple |
| 2019/0322164 A1* | 10/2019 | Sasaki .................. B62D 21/155 |

FOREIGN PATENT DOCUMENTS

| | | |
|---|---|---|
| DE | 10 2016 007 124 A1 | 2/2017 |
| DE | 10 2016 212 297 A1 | 1/2018 |
| DE | 10 2016 219 242 A1 | 4/2018 |

OTHER PUBLICATIONS

German-language Written Opinion (PCT/ISA/237) issued in PCT Application No. PCT/EP2021/074213 dated Nov. 22, 2021 (four (4) pages).

German-language Written Opinion (PCT/ISA/237) issued in PCT Application No. 10 2020 123 289.6 dated Jul. 20, 2021 (six (6) pages).

\* cited by examiner

ENERGY-STORE FLOOR ASSEMBLY FOR AN ELECTRICALLY DRIVABLE PASSENGER CAR

BACKGROUND AND SUMMARY

The invention relates to an energy-store floor assembly for an electrically drivable passenger car. The invention furthermore relates to a modular system for such an energy-store floor assembly.

In the case of many passenger cars which will be marketed in the future, it is envisaged that customers will be offered different drive concepts within a vehicle range. Thus, electric vehicles (xEV) will also be marketed alongside vehicles with a pure internal combustion engine (ICE). These electric vehicles (xEV) can be differentiated, for example, into pure electric vehicles (BEV) and hybrid vehicles (PHEV) in which an internal combustion engine is also provided in addition to the electric drive. It is known that these different drive concepts require a wide range of amounts of structural space within the vehicle, in which corresponding units, components, or the like of the respective drive are arranged. This also causes considerable adaptations in terms of the frame of previous vehicles, which make the production or mounting of the different variants within a vehicle range considerably more complicated and in particular more expensive.

A particularly demanding challenge here is also to fix the components of respective variants of the energy-store floor assembly, for example for a pure electric drive (BEV) or a hybrid drive (PHEV), at fastening points of the frame-side floor assembly which is to be used across all variants for all variants of electric drives with as few modifications as possible. There is thus, on the one hand, the challenge of using a frame-side floor assembly which is as uniform as possible and is applicable across all variants but on which the respective components of the respective electric drive can, on the one hand, be fixed particularly reliably and stably but, on the other hand, can also be fixed particularly simply and cost-effectively to the frame-side floor assembly.

The object of the present invention is therefore to provide an energy-store floor assembly which has a high degree of flexibility in terms of the mounting of the respective components of the corresponding variants of electric drives but, on the other hand, also ensures optimal attachment of these components.

This object is achieved according to the invention by an energy-store floor assembly and by a modular system for such an energy-store floor assembly in accordance with the indepedenent claims. Favorable embodiments of the invention are the subject of the dependent claims.

The energy-store floor assembly according to the invention for an electrically drivable passenger car comprises a frame-side floor assembly to the underside of which an energy store of an electric drive of the passenger car is secured, wherein respective side holders, in the region of which a respective fastening point is arranged to which the energy store can be fastened, are arranged on the floor assembly. These respective side holders are preferably arranged as extensions, in the longitudinal direction of the vehicle, behind respective side sills or at the transition region of the rear ends of the side sills to adjoining rear longitudinal beams in order to create additional fastening points which are used, across all variants, for all variants of the energy-store floor assembly with an electric drive (BEV, PHEV).

In a first variant of the energy-store floor assembly for a pure electric drive (BEV), the side holders serve to fix an energy store, inserted therein and consequently extending a long way rearward in the longitudinal direction of the vehicle, securely on the floor assembly in the rear region too. Namely, usually the problem arises that the energy store/high-voltage store is already fastened to the underside of the floor assembly during mounting before the so-called marriage of the floor assembly to the drive and chassis of the car. It should in particular be prevented in this intervening period that the energy store hangs free with its rear end and with no direct fastening to the floor assembly, which may result in a type of sagging and in damage associated therewith to the energy store. A body fastening of the energy store a long way behind its center of gravity consequently needs to be achieved especially for an energy-store floor assembly which is used in the case of a pure electric drive (BEV) so that, in the case of separate store mounting, the energy store/high-voltage store does not hang free before the marriage.

It is advantageous here that the side holders can also be used to particularly favorably retain, for example, respective struts which, in the case of the energy-store floor assembly for a hybrid drive (PHEV), are used in order to connect, for example, the rear axle mount to the side sills. A structural node between the side sills, associated longitudinal beams at the rear, and a heel plate as an additional attachment for the respective strut can be used here by means of the holders, which has the consequence that the energy-store floor assembly is furthermore by and large the same in both variants, i.e. for a pure electric drive (BEV) and for an hybrid drive (PHEV).

In a further advantageous embodiment of the invention, in a first variant of the energy-store floor assembly for a passenger car with an exclusively electric drive (BEV), the energy store has, adjacent to its respective fastening point on the corresponding holder, a respective fastening point for a cross member running in the transverse direction of the vehicle. This means that, in a particularly advantageous embodiment of the invention, the front side ends of the cross member are not connected directly to the respective frame-side holders of the floor assembly and instead via the energy store. As a result, for example, a vertical offset which exists in the vertical direction of the vehicle between the respective holder and the corresponding end of the cross member can be bridged by means of the energy store. In addition, the rear end of the energy store, which then has a correspondingly relatively long design in the longitudinal direction of the vehicle, can be fixed by means of the the rear region of the said energy store, on the one hand, directly to the floor assembly, and, on the other hand, the described cross member, which improves in particular the retention of the energy store in a rear central region of the floor assembly, can also be fastened to the holders of the energy store via additional fastening points.

Particularly favorable retention or support of this energy store can be effected here in a further embodiment of the invention if the cross member is moreover connected to a rear axle mount. As a result, a particularly favorable join is obtained between the rear end of the energy store and the rear axle mount.

It has furthermore been shown to be advantageous if the fastening points of the holders are provided, in a second variant of the energy-store floor assembly for a passenger car with a hybrid drive (PHEV), for fastening respective struts which are connected, on the one hand, to respective side sills and the energy store and, on the other hand, to a rear axle mount. In particular, a respective additional support point of the struts on the frame is thus achieved by the holders, as a result of which their stiffness and stability are further increased.

It is additionally advantageous if, in the first and the second variant of the energy-store floor assembly, the same fastening points of the holders serve to fasten the cross member or the struts. The holders can thus be used particularly simply across all variants.

In a further embodiment of the invention, the holders are arranged in the region of a rear end floor, situated behind a main floor, of the floor assembly. Respective anchoring points for an energy store in particular of a pure electric drive (BEV) are thus obtained by means of the holders a long way to the rear on the floor assembly in the region of the rear end floor.

The advantages described above in connection with the energy-store floor assembly according to the invention apply in the same way for the modular system having such an energy-store floor assembly. The latter is characterized by a floor assembly which is applicable across all variants and has a main floor and a rear end floor and at which respective side holders are provided in particular behind the respective side sills or in the transition region to holders arranged behind inner or rear longitudinal beams adjoining the rear of the side sills, wherein, in a first variant for a passenger car with an exclusively electric drive (BEV), an energy store is provided which extends below both the main floor and the rear end floor and which is secured to the holders, and wherein, in a second variant for a passenger car with a hybrid drive (PHEV), an energy store which extends only below the main floor, a fuel tank which extends below the rear end floor, and respective struts which are connected to respective side sills, to the holders, and to a rear axle mount, are provided.

Further features of the invention become apparent from the claims, the drawings, and the description of the drawings. The features and combinations of features mentioned above in the description, and the features and combinations of features mentioned below in the description of the drawings and/or shown solely in the drawings can be used not only in the respective stated combination but also in other combinations or individually.

The invention is now explained in detail with the aid of a preferred exemplary embodiment and with reference to the drawings.

DETAILED DESCRIPTION OF THE DRAWINGS

Figure 1A:
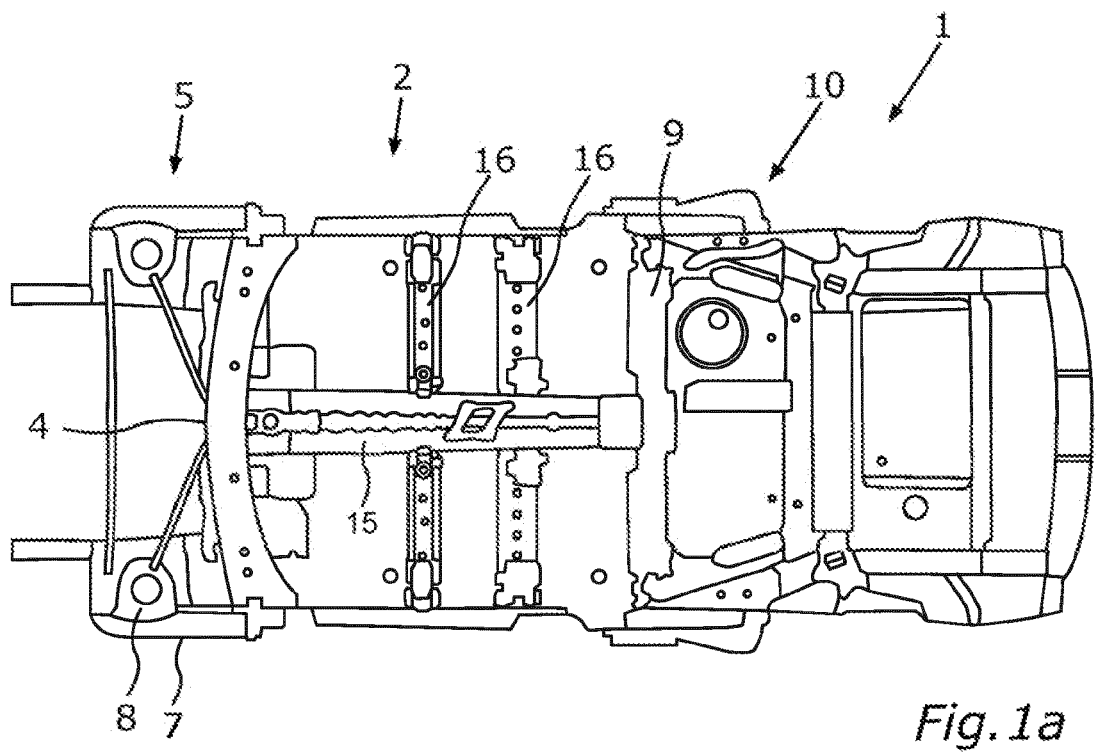
FIGS. 1a, b are a plan view and a view from below, respectively, of a floor assembly, which is applicable across all variants, for an electrically drivable passenger car which, in a first variant of the energy-store floor assembly, is provided for a vehicle exclusively with an electric drive (BEV) and, in a second variant of the energy-store floor assembly, is provided for a vehicle with a hybrid drive (PHEV).
Figure 1B:
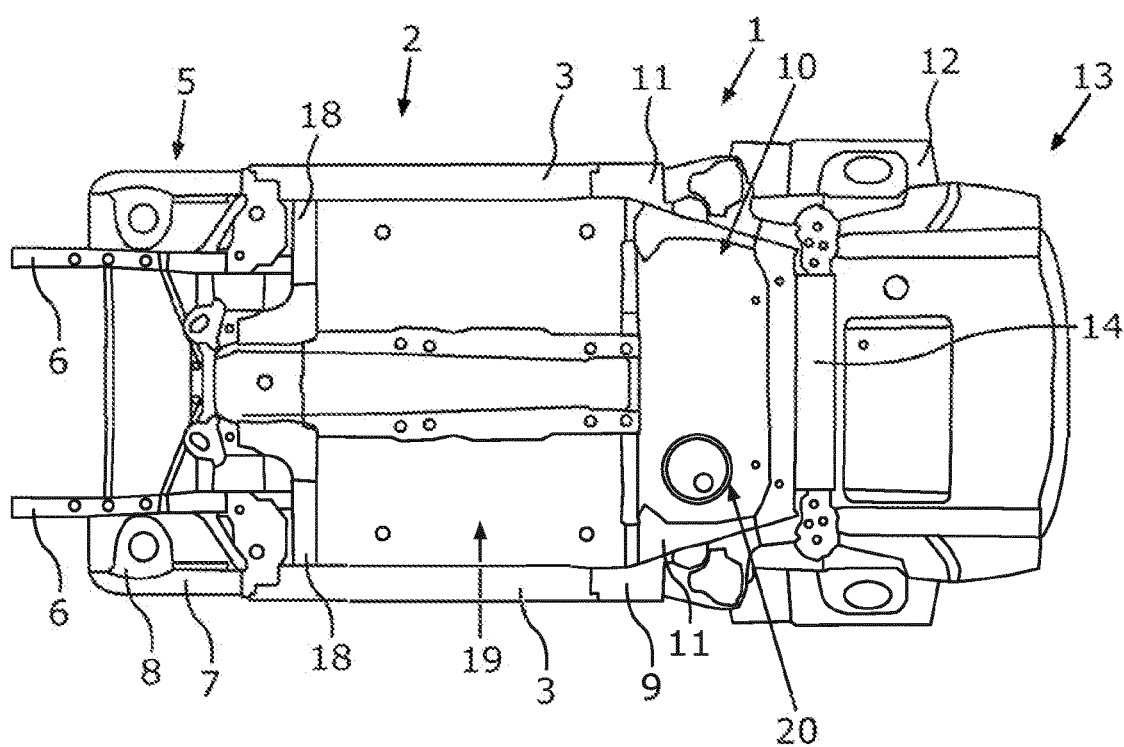

Illustrated in FIGS. 1a and 1b are a plan view and a view from below, respectively, of a floor assembly 1, which is applicable across all variants, for an electrically drivable passenger car. Visible here is a main floor 2 which is bounded laterally by respective side sills 3 and extends forward as far as a front end wall 4. A front vehicle structure 5, which comprises respective engine longitudinal beams or main longitudinal beams 6, adjoins the main floor 2 at the front. Respective wheel arch frames 7, which are provided with respective suspension strut domes 8 at the top, are situated on the sides of the engine longitudinal beams 6.

The main floor 2 extends rearward as far as a heel wall 9 at which the main floor 2 merges into a rear end floor 10. Viewed in the longitudinal direction of the vehicle, rear longitudinal beams 11, which extend, inside respective wheel arch frames 12, in the region of a rear part 13 of the car as far as the vehicle tail, adjoin the rear ends of the respective side sills 3 in the region of the heel wall 9. A cross beam 14, which interconnects the rear longitudinal beams 11, moreover extends in the transverse direction of the vehicle, at the level of the rear wheel arch frames 12.

Also visible is a central tunnel 15 which extends from the heel plate 9 forward as far as the front end wall 4. Respective seat cross beams 16, which run in the transverse direction of the vehicle outward as far as the corresponding side sills 3, also adjoin the central tunnel 15.

Figure 2:
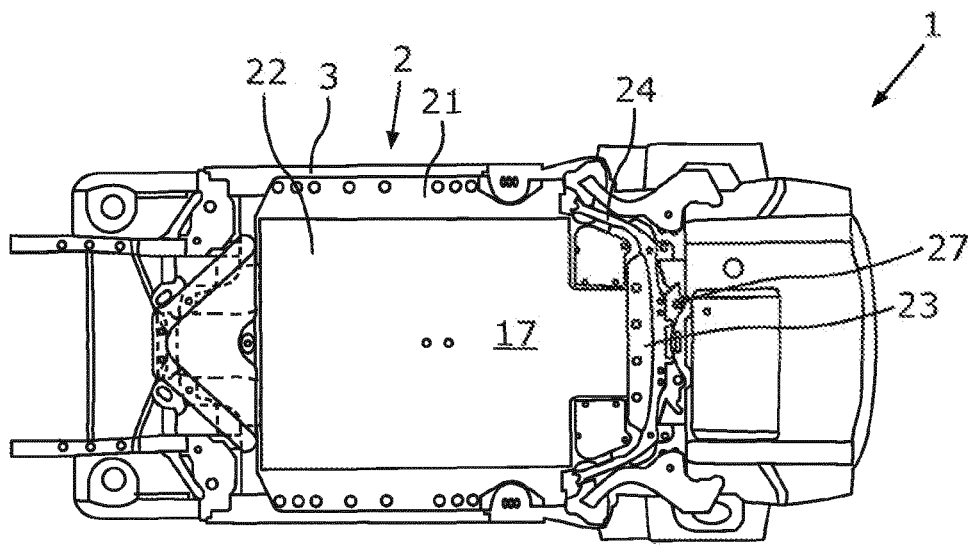
FIG. 2 is a view from below of an energy-store floor assembly according to the first variant for a passenger car with an exclusively electric drive (BEV) and an energy store which extends below both a main floor and below a rear end floor rearward as far as a cross member.
Figure 3A:
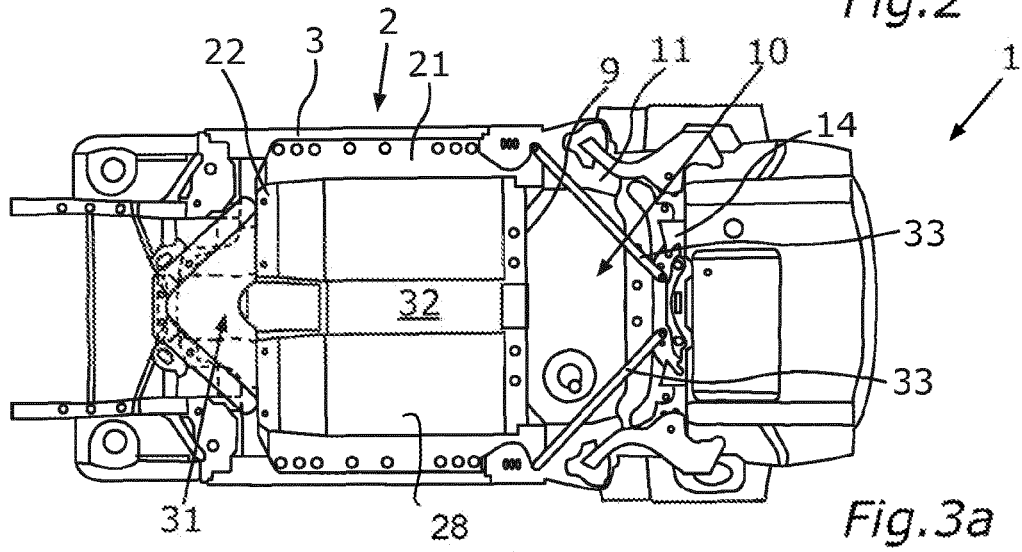
FIGS. 3a, b are respective views from below of the energy-store floor assembly according to the second variant for a passenger car with a hybrid drive (PHEV) with an energy store which extends only below the main floor, and with a fuel tank which extends below the rear end floor, wherein an exhaust system can be seen in FIG. 3b in addition to the fuel tank.
Figure 3B:
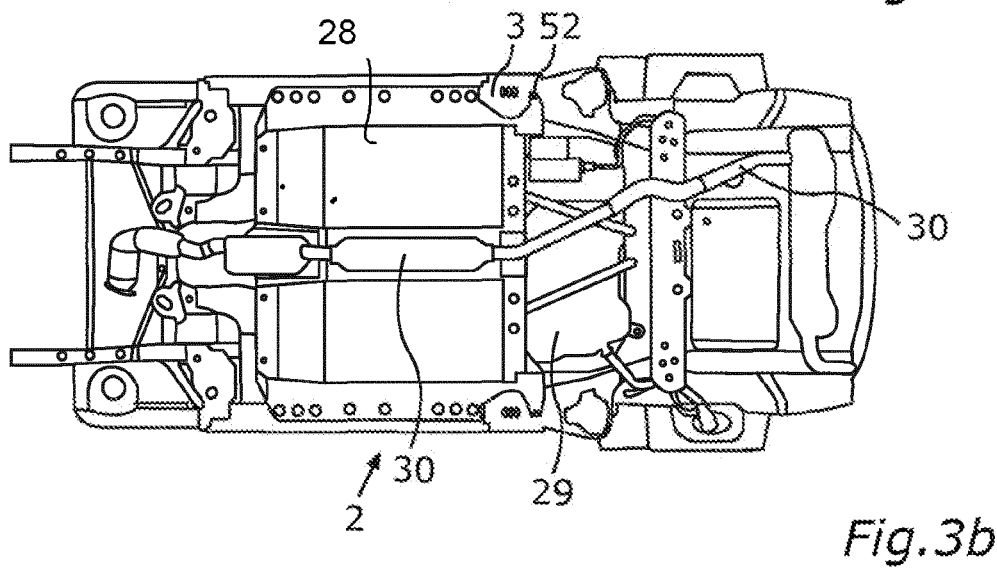

It will now be explained with the aid of FIGS. 2 to 3b how the floor assembly 1 according to FIGS. 1a and 1b, which is applicable across all variants, is equipped with different components in order to form either a first variant of an energy-store floor assembly for a passenger car with an exclusively electric drive (BEV), as shown in FIG. 2, or a second variant of the energy-store floor assembly for a passenger car with a hybrid drive (PHEV), as shown in FIGS. 3a and 3b. In other words, one and the same floor assembly 1 according to FIGS. 1a and 1b, which is diversified in terms of the two different variants of the energy-store floor assembly by mounting different components, is used for both variants (BEV, PHEV) of the energy-store floor assembly on the frame side.

Thus, according to the method according to the invention, the first variant of the energy-store floor assembly for a passenger car with an exclusively electric drive (BEV) is obtained by a continuous energy store 17, which extends in the transverse direction of the vehicle outward as far as the respective side sills 3, being used on the underside of both the main floor 2 and the rear end floor 10. The energy store 17 extends forward as far as respective front longitudinal beams 18 which can be seen in FIG. 1b and bound at the front a holder recess 19 of the main floor 2 for the energy store 17. The holder recess 19 is bounded on the outside by the side sills 3 and at the rear by the heel plate 9. The energy store 17 extends rearward beyond the heel plate 9 into the region of a holder recess 20 below the rear end floor 10, wherein the holder recess 20 is bounded at the front and back by the heel plate 9 or the cross beam 14 and on the outside by the longitudinal beams 11.

It can in particular be seen that the energy store 17 is screwed on the outside to the side sills 3 by means of respective profiles 21. Front-side fastening of the energy store 17 by means of a profile 22 to the cross beams 18 via respective screw elements can be seen in addition.

The rear fastening of the energy store 17 of the first variant according to FIG. 2 is effected by means of a cross member 23 which with its respective front outer ends 24 on the energy store in a manner explained in more detail below in conjunction with FIG. 6. In addition, the cross member 23 is connected, on the one hand, to the rear end of the energy store 17 by means of respective screw connections 25 and, on the other hand, to a rear axle mount 27 via respective screw connections 26. The energy store or the rear axle mount 27 separated from the high-voltage store 17, or the other way round, can thus be dismounted by means of the cross member 23. In addition, it is achieved by means of the cross member 23 that the energy store 17 does not, for example, hang down in its rear region which is connected to the floor assembly 1. In addition, the cross member 23 serves as protection for the energy store, for example, in the case of driving into a curb or driving into or over a bollard.

The second variant of the energy-store floor assembly for a hybrid drive (PHEV) of the passenger car can be seen in FIGS. 3a and 3b. In contrast to the first variant according to FIG. 2, an energy store 28 is provided here which extends forward or to the sides in a similar fashion to the energy store 17 according to the first variant. To the rear, the energy store 28 ends in the longitudinal direction of the vehicle at least essentially at the heel wall 9. In contrast to the first variant, the energy store 28 is thus not provided in the region of the rear end floor 10.

Instead, as can be seen from FIG. 3b, a fuel tank 29 for an internal combustion engine of the hybrid drive (PHEV) of the passenger car is arranged there. It can moreover be seen from FIG. 3b that an exhaust system 30 runs, on the underside of the energy-store floor assembly, from the front part 5 of the car to the rear part 13 of the car. The exhaust system 30 here runs from the front in longitudinal sections, namely over a longitudinal portion 31, inside the central tunnel 15 of the floor assembly 1. Moreover, a tunnel 32 has been cut inside the energy store 28 and as an extension of the longitudinal portion 31 of the central tunnel 15.

Lastly, two struts 33, which are fastened on the one hand with respective front ends to the associated side sill 3 and with respective lower ends to the rear axle mount 27, can be seen in FIG. 3a. The rear axle mount 27 is thus connected to the respective side sills 3 via the corresponding struts 33.

Figure 4:
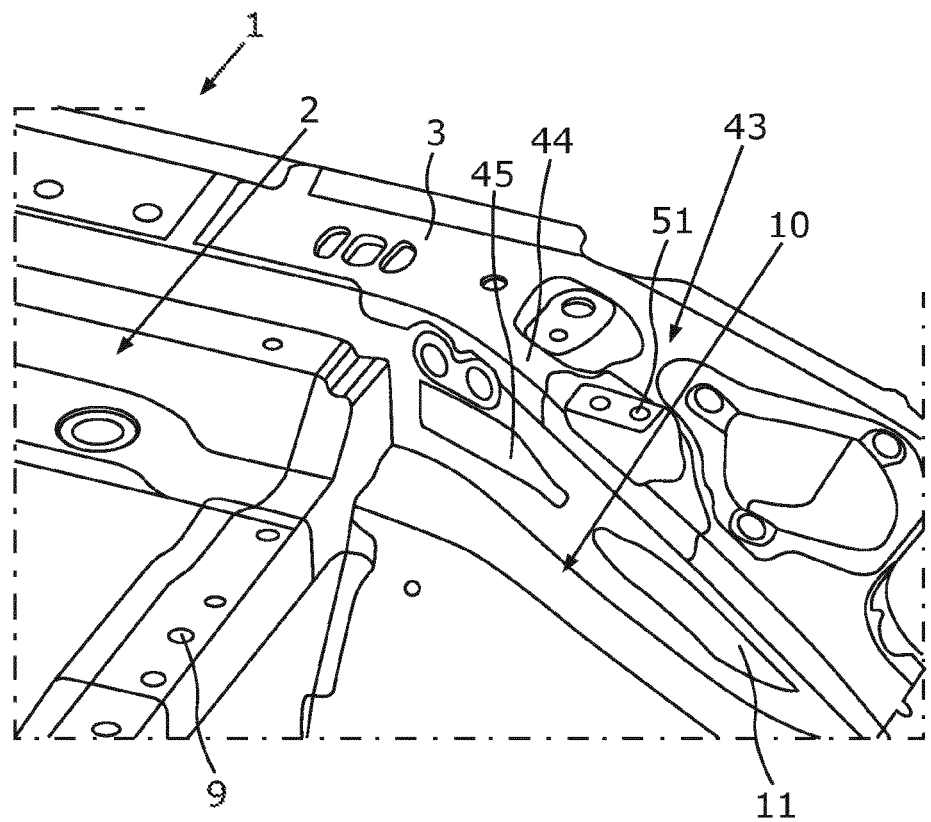
FIG. 4 is a partial perspective view of the frame-side floor assembly according to FIGS. 1a and 1b, wherein a holder arranged on the corresponding vehicle side is arranged at the rear end of a laterally associated side sill or at the transition region of this side sill to a rear or inner longitudinal beam adjoining the rear of the side sill.

FIG. 4 shows a partial perspective view of the underside of the floor assembly 1 on the left-hand side, viewed in the forward driving direction. Visible here is a rear end 42 of the corresponding side sill 3, in the region of which the side sill 3 merges into the laterally associated rear longitudinal beam 11. Also visible is the heel wall 9 which divides the main floor 2 from the rear end floor 10. As can now be seen in particular from FIG. 4, a side holder 43 is arranged at the front end of the rear cross beam 11 and in the transition region between the rear end 42 of the side sill 3 and the front end of the rear longitudinal beam 11. It is situated at the level of the rear end floor 10, viewed in the longitudinal direction of the vehicle. In the present case, the holder 43 here takes the form of a shaped sheet-metal part and is joined to an underside 44 or inner side 45 of the longitudinal beam 11, across the corner. Other embodiments would of course also be conceivable here. A symmetrically identical or identically arranged holder 43 is also situated on the opposite right-hand side of the vehicle.

The respective holder 43 here serves, as will be explained further below in conjunction with FIG. 6, in the first variant of the energy-store floor assembly for an exclusively electric drive (BEV), to fasten the energy store 28 to the body frame. This can be seen in particular in FIG. 5a, in which, in a partial perspective view from below, the fastening of the energy store 17 extending as far as the rear end floor 10 in the longitudinal direction of the vehicle according to the first variant of the energy-store floor assembly is illustrated.

Figure 5A:
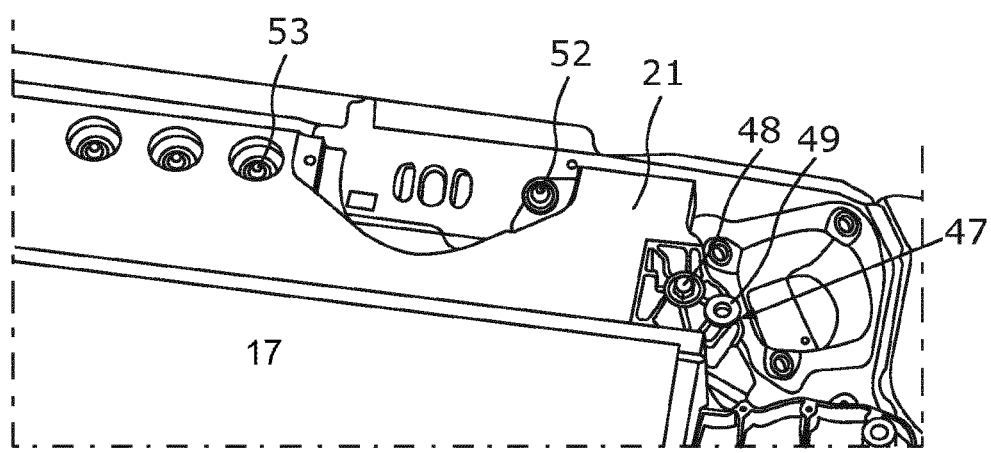
FIGS. 5a-c show a partial perspective view of the underside arrangement of the energy store for the energy-store floor assembly according to the first variant in the region of the associated holder, a partial view from below of the energy-store floor assembly according to the first variant, in which a cross member, which is moreover connected to a rear axle mount, is provided at the rear end of the energy store, and a perspective view from below of the cross member according to FIG. 5b in the region of the respective laterally associated holder.

It can be seen here from FIG. 5a that the energy store 17 is fastened to the holder 43 in the region of the outer profile 21 by means of a screw 48 screwed into a threaded hole/fastening point 51 of the holder 43. Also visible in the region of the profile 21 is a fastening point 47 with a further sleeve 49 which is designed, for example, as a through sleeve such that the cross member 23 can be fixed by means of a screw or similar fastening element which can be seen below in particular in FIGS. 5b and 5c. The screw 50 can consequently be screwed into a thread of the sleeve 49 fastened to the energy store 28. A direct solution would of course also be conceivable here, wherein, for example, the energy store 17 is fastened, on the one hand, to the threaded hole 51, and the cross member 23 itself to the energy store 17. The present fastening point 47 of the cross member 23 to the sleeve 49 can consequently be formed either indirectly or directly on the energy store. However, the essential thing is that the fastening point 47 for the cross member 23 is arranged, in the vertical direction of the vehicle, at least adjacent to the associated holder 43 in order to obtain an optimal load path or optimal force transmission.

Also visible from FIG. 5a is a rearmost screw 52 and further screws 53 by means of which the profile 46 of the energy store 17 is fixed to the underside of the side sill 3 on the respective side of the vehicle. It can consequently be seen that a fastening point of the energy store is created on the side sill 3 behind the last fastening option by means of the respective holder 43 in order to create as a result in particular further body fastening points situated at the rear for the energy store 17 such that, in the case of separate store mounting, the rear end of the energy store 17 is already fastened on the frame side to chassis and drive components such as the rear axle mount 27 before the marriage of the energy-store floor assembly. In addition, the respective holder 43 thus serves as the last body fastening point in the longitudinal direction of the vehicle for the energy store 17 so that loads can be diverted from the cross member 23 to the body or floor assembly 1. It is thus necessary to secure the energy store 17 by means of the screw 48 as a minimum screw connection so that the energy store 17 does not hang freely before the marriage and can withstand corresponding damage.

The fastening of the cross member 23 is illustrated here with the aid of FIGS. 5*b* and 5*c* in a partial view from below or a partial perspective view. It can in particular be seen here that the respective front ends 24 of the cross member 23 are fixed by means of the associated screw 50 to the corresponding holder 43 and hence to the frame side on the respective side of the vehicle.

Figure 5B:
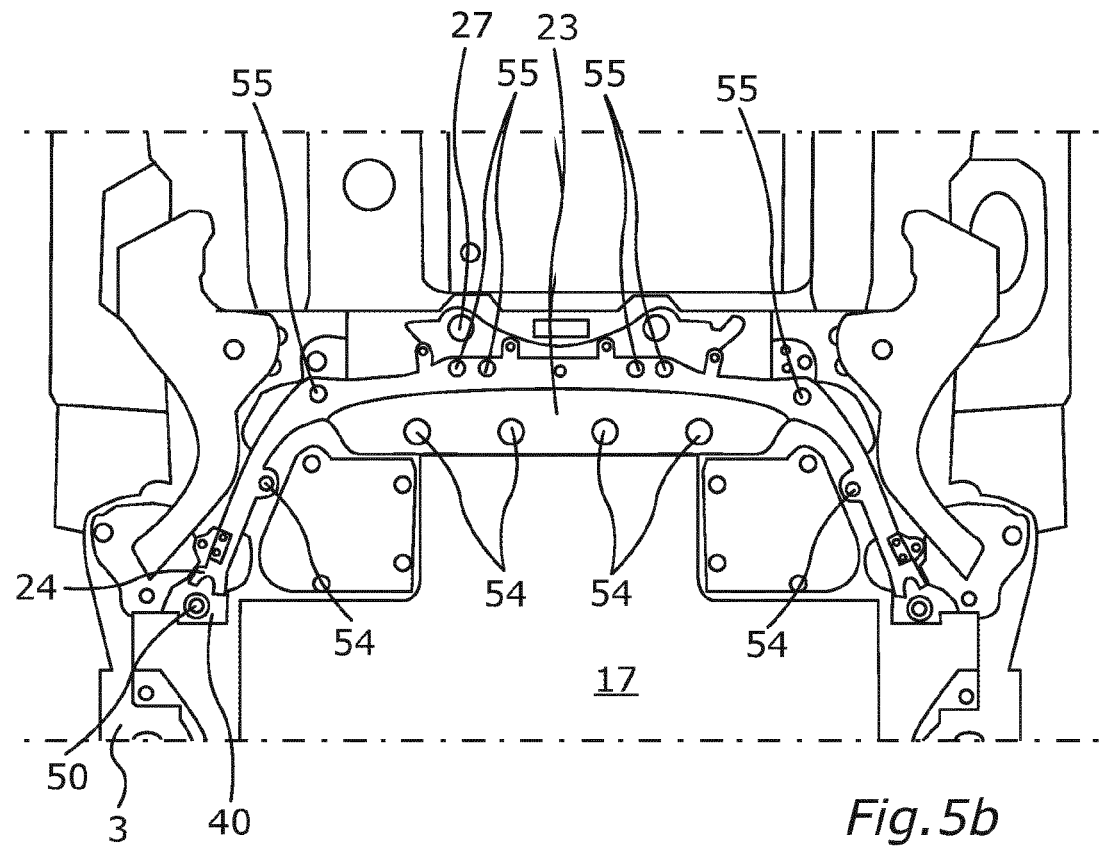
Figure 5C:
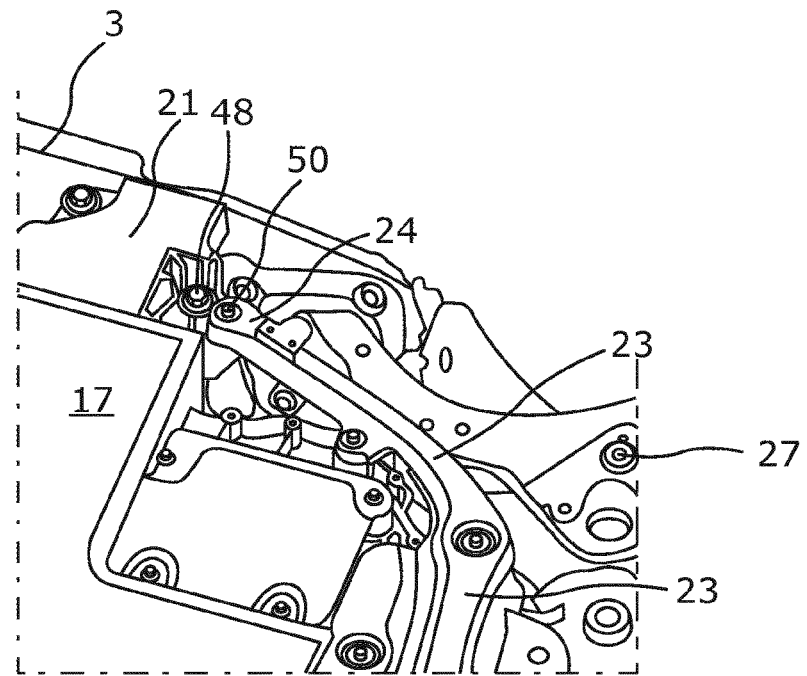

A total of six screw connections 54 can moreover be seen in particular in FIG. 5*b*, by means of which the cross member 23 is connected to the rear end of the energy store 17. Particularly favorable support of the energy store 17 is thus achieved. A plurality of screw connections 55 can moreover be seen, by means of which the cross member 23 is connected to the rear axle mount 27. A particularly favorable join between the member 23 and the rear axle mount 27 or a particularly favorable support of these parts on the floor assembly 1 and favorable fastening of the energy store 17 are thus achieved as a whole. A further advantage is that both the cross member 27 and the energy store 17, and also the rear axle mount 27, can each be mounted and dismounted separately in order to avoid complex mounting processes, for example, when replacing worn components.

Figure 6:
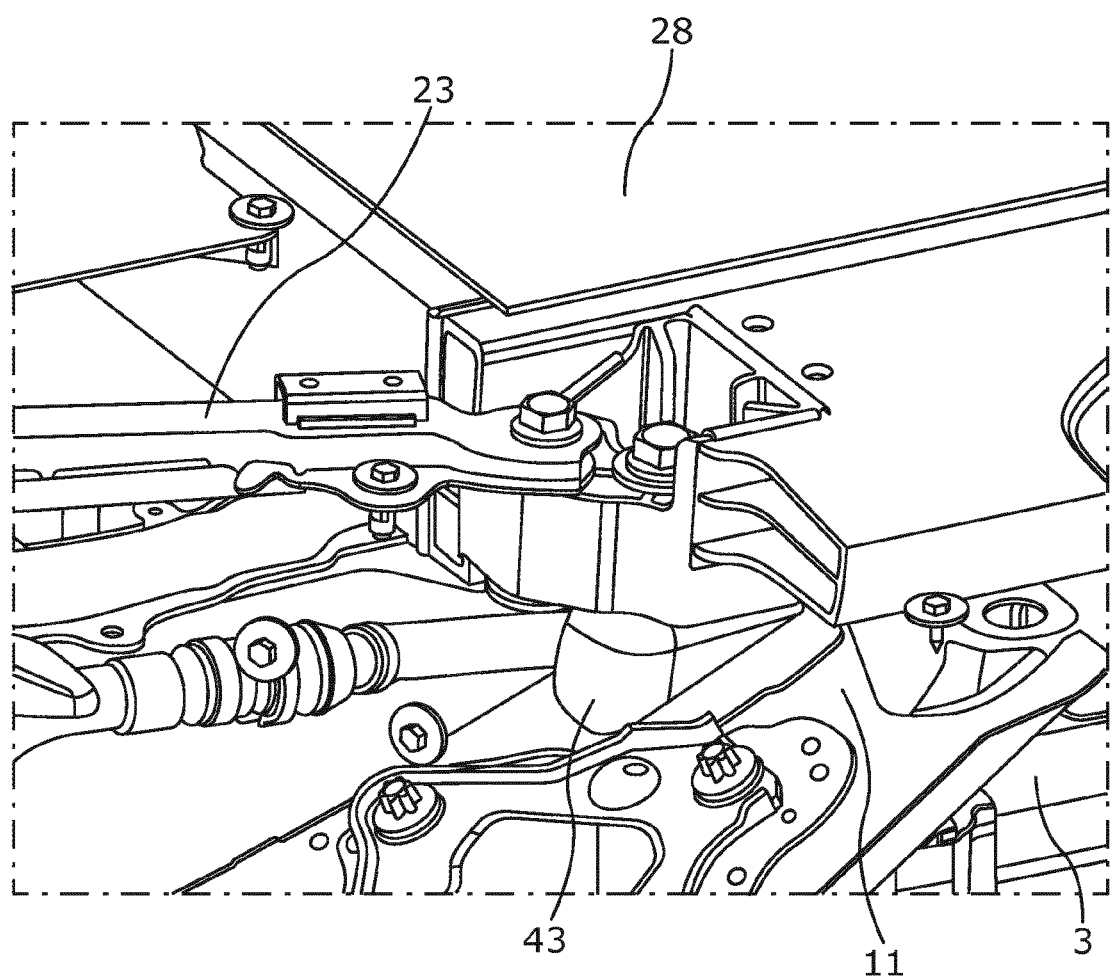
FIG. 6 is a partial perspective view of a rear region of the energy store for the first variant of the energy-store floor assembly.

The rear region of the energy store 28 is again illustrated with the aid of FIG. 6 in a partial perspective view for the first variant of the energy-store floor assembly for a pure electric drive (BEV). It can be seen here in particular that the cross member 23 running in the transverse direction of the vehicle is secured in the rear region of the energy store 28, and that the energy store 17 is connected to the holder 43, fixed to the body, in the attachment region of the cross member 23. The holder 43, fixed to the body, is here fastened to the body on the underside of the rear longitudinal beam 11.

Figure 7:
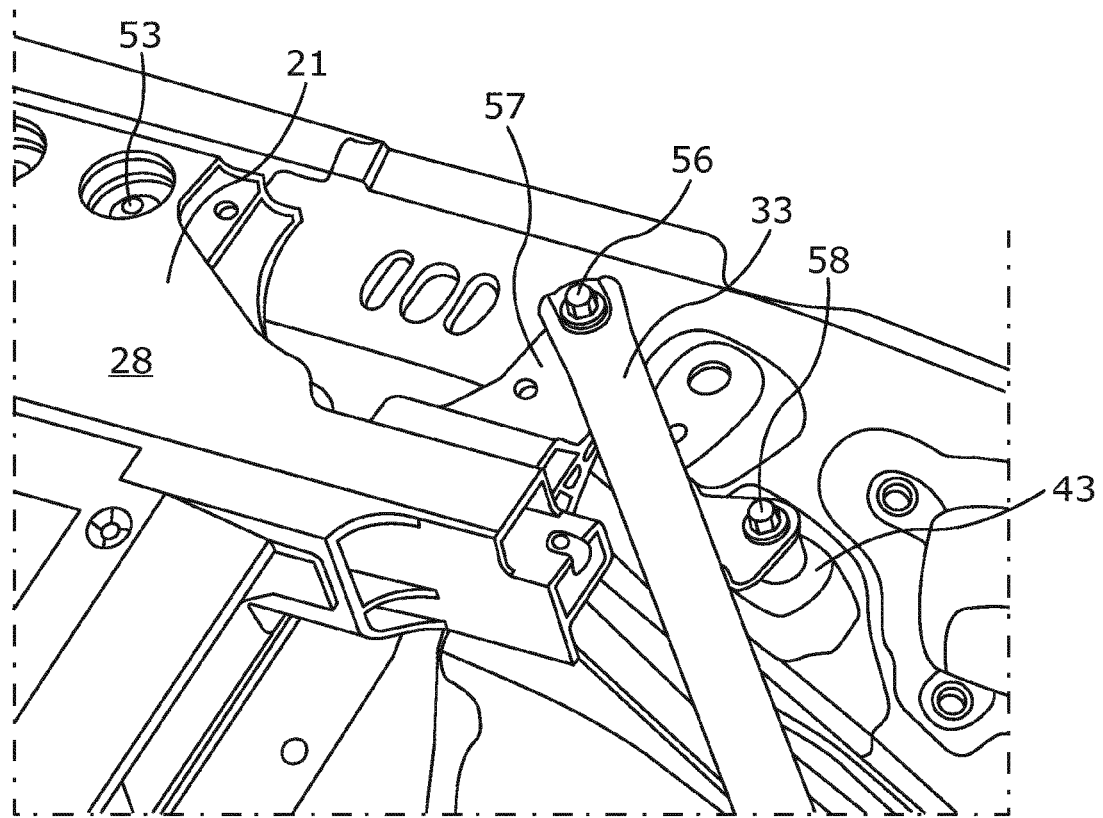
FIG. 7 is a partial and perspective view from below of the energy-store floor assembly according to the second variant in which a laterally associated strut is secured with its lateral front end, via the energy store, to the rear end of the side sill and moreover to the lateral associated holder.

FIG. 7 shows, in a partial perspective view from below, the use of the respective side holder 43 in the second variant of the energy-store floor assembly for a hybrid drive (PHEV). The specific fastening of the respective strut 33 on the floor assembly 1 can be seen here. It can first be seen here that the strut 33 is fastened on an outer front end via a screw connection 56 at the rear end of the corresponding side sill 3. The fastening of the strut 33 is here effected via, or with the interposition of, a bracket 57 of the profile 46 of the energy store 28. The strut is moreover fixed to the corresponding threaded hole 50 of the holder 43 by means of a screw connection 58. An optimized connection 33 to the side sill 3 and to the rear longitudinal beam 11 via the holder 43 and to the heel plate 9 via the holder 43 thus results in order thus to achieve optimal support of the rear axle mount 27.

LIST OF REFERENCE NUMERALS

1 floor assembly
2 main floor
3 side sill
4 end wall
5 front car structure
6 main longitudinal beam
7 wheel arch frame
8 suspension strut dome
9 heel plate
10 rear end floor
11 longitudinal beam
12 wheel arch frames
13 rear part of the vehicle
14 cross beam
15 central tunnel
16 seat cross beam
17 energy store
18 longitudinal beam
19 holder recess
20 holder recess
21 profile
22 profile
23 cross member
24 end
25 screw connection
26 screw connection
27 rear axle mount
28 energy store
29 fuel tank
30 exhaust system
31 longitudinal portion
32 tunnel
33 strut
42 end
43 holder
44 underside
45 inner side
46 profile
47 fastening point
48 screw
49 sleeve
50 screw
51 fastening point
52 screw
53 screw
54 screw connection
55 screw connection
56 screw connection
57 bracket
58 screw connection

The invention claimed is:

1. An energy-store floor assembly for an electrically drivable passenger car, comprising:
   a floor assembly;
   an energy store of an electric drive of the passenger car, the energy store being secured to an underside of the floor assembly; and
   respective side holders positioned on the floor assembly, in a region of which side holders a respective fastening point is arranged to which the energy store is fastenable, wherein the side holders are positioned along a rear longitudinal beam adjoining a side sill;
   wherein in a first variant of the energy-store floor assembly for a passenger car with an exclusively electric drive, the energy store has, adjacent to its respective fastening point on the corresponding side holder, a respective fastening point for a cross member running in a transverse direction of the vehicle.

2. The energy-store floor assembly according to claim 1, wherein
   the cross member is connected to a rear axle mount.

3. The energy-store floor assembly according to claim 1, wherein
   the side holders are fastened below the rear longitudinal beam adjoining the side sill.

4. The energy-store floor assembly according to claim 1, wherein the fastening points of the side holders are provided, in a second variant of the energy-store floor assembly for a passenger car with a hybrid drive, for fastening respective struts which are connected, at one end, to respective side sills and the energy store and, at another end, to a rear axle mount.

5. The energy-store floor assembly according to claim 4, wherein
in the first and the second variants of the energy store floor assembly, the same fastening points of the side holders serve to fasten the cross member or the struts.

6. The energy-store floor assembly according to claim 1, wherein
the side holders are arranged in the region of a rear end floor, situated behind a main floor, of the floor assembly.

7. A modular system for an energy-store floor assembly for an electrically drivable passenger car, with a floor assembly which is applicable across all variants and has a main floor and a rear end floor and at which respective side holders are arranged, wherein:
  (i) in a first variant for a passenger car with an exclusively electric drive, an energy store is provided which extends below both the main floor and the rear end floor and which is secured to the side holders, and which has, adjacent to its respective fastening point on the corresponding side holder, a respective fastening point for a cross member running in a transverse direction of the vehicle, and
  (ii) in a second variant for a passenger car with a hybrid drive, an energy store which extends only below the main floor, a fuel tank which extends below the rear end floor, and respective struts which are connected to respective side sills, to the side holders, and to a rear axle mount, are provided.

\* \* \* \* \*